United States Patent
Hsu et al.

(10) Patent No.: US 10,637,259 B2
(45) Date of Patent: Apr. 28, 2020

(54) CHARGING CONTROL SYSTEM AND SHORT-CIRCUIT CURRENT PROTECTING METHOD THEREOF

(71) Applicant: Aver Information Inc., New Taipei (TW)

(72) Inventors: Chi-Fa Hsu, New Taipei (TW); Chao-Hung Chang, New Taipei (TW); Lien-Kai Chou, New Taipei (TW); Cheng-Cheng Yu, New Taipei (TW)

(73) Assignee: AVER INFORMATION INC., New Taipei (TW)

( * ) Notice: Subject to any disclaimer, the term of this patent is extended or adjusted under 35 U.S.C. 154(b) by 73 days.

(21) Appl. No.: 15/973,967

(22) Filed: May 8, 2018

(65) Prior Publication Data
US 2018/0342882 A1    Nov. 29, 2018

(30) Foreign Application Priority Data
May 23, 2017    (TW) .............................. 106117001 A

(51) Int. Cl.
H02J 7/00    (2006.01)
H02J 7/04    (2006.01)

(52) U.S. Cl.
CPC .......... H02J 7/0026 (2013.01); H02J 7/0083 (2013.01); H02J 7/045 (2013.01)

(58) Field of Classification Search
CPC .................................................... H02J 7/0026
USPC .................................................. 320/134, 136
See application file for complete search history.

(56) References Cited

U.S. PATENT DOCUMENTS

| 5,570,277 | A | * | 10/1996 | Ito | H02M 1/32 363/19 |
|---|---|---|---|---|---|
| 6,107,926 | A | * | 8/2000 | Kifuku | B62D 5/0487 340/650 |
| 2007/0103006 | A1 | * | 5/2007 | Zushi | H03K 17/0822 307/130 |

FOREIGN PATENT DOCUMENTS

| CN | 106208230 A | 12/2016 |
|---|---|---|
| TW | 517420 B | 1/2003 |
| WO | 2010035082 A2 | 4/2010 |

* cited by examiner

Primary Examiner — Edward Tso
Assistant Examiner — Ahmed H Omar
(74) Attorney, Agent, or Firm — McClure, Qualey & Rodack, LLP

(57) ABSTRACT

A short-circuit current protecting method of a charging control system is cooperating with at least a control unit and a plurality of power outlet electrically connected to an electronic switch. The control unit controls the mode of the electronic switches with turn on or off. The short-circuit current protecting method includes the following steps. Step 1 is detecting at least a current signal value of an AC power. Step 2 is determining whether the current signal value is grater than a predetermine current threshold. Step 3 is enabling a short-circuit current analyzing module if the current signal value is grater than the predetermine current threshold. Step 4 is turning off at least one of the electronic switches if the short-circuit current is determined by the short-circuit current analyzing module.

14 Claims, 5 Drawing Sheets

CHARGING CONTROL SYSTEM AND SHORT-CIRCUIT CURRENT PROTECTING METHOD THEREOF

CROSS REFERENCE TO RELATED APPLICATIONS

This Non-provisional application claims priority under 35 U.S.C. § 119(a) on Patent Application No. 106117001 filed in Taiwan on May 23, 2017, the entire contents of which are hereby incorporated by reference.

BACKGROUND

1. Technical Field

The present invention relates to a charging control system, especially a charging control system and short-circuit current protecting method thereof.

2. Description of Related Art

With the rapid change of technology and the increase of environmental awareness, lots of teaching units introduce digital devices including tablet PC or laptop into teaching activities to reach the paperless purpose.

In order to contain several or tens of digital devices and charge them, the teaching unit also introduces a charging control system for the above function. The charging control system is often designed to contain tens of digital devices, and equipped with tens of power outlets corresponding to digital devices for charging digital devices. Charging control system is equipped with numerous power outlets, therefore, it will increase the chance that short-circuit occurs on power outlet of charging control system due to artificial abnormal use, abnormality of digital device connected or other factors.

To prevent that the short-circuit current during short circuit of power outlet damages the charging control system, the charging control system is usually equipped with reset or non-reset short-circuit protection component (like fuse or no-fuse switch); the physical property of the short-circuit protection component is to break the short circuit path when short-circuit current happens and thus reach the purpose of protecting the charging control system. However, in the actual use, the response of short-circuit protection component under short-circuit current is mostly not real-time, in other words, the component on short circuit path has been burned out, but the protection component hasn't broken the short circuit path, or even if the component on the short circuit path hasn't been burned out, its service life may also be shortened because that the short-circuit current lasts too long, thus producing negative impact for the service life of the charging control system.

In order to improve the above situation, some practitioners choose to use the short-circuit protection component with rapid response time. However, the charging control system is equipped with numerous power outlets, each power outlet is connected to the power adaptor of an electronic device, and each power adaptor is set with a capacitor to stabilize its input power; according to the charge intelligent-algorithm, in the charging control system, multiple power outlets may be opened simultaneously to charge the capacitor of tens of power adaptors, when an instantaneous inrush current will be generated. This inrush current only lasts for a short while, but it may allow the short circuit protection component with fast response time to actuate and break the power path, thus causing malfunction protection of the charging control system.

Therefore, it is one of the important subjects to provide a charging control system and short-circuit current protecting method thereof to carry out real-time and correct short-circuit current protection.

SUMMARY OF THE INVENTION

The main purpose of the present invention is to provide a charging control system and short-circuit current protecting method; this method can determine whether short-circuit current happens in a real-time and correct way, and thus maintain the effective operation of the charging control system.

To achieve the above purpose, the present invention provides a short-circuit current protecting method of a charging control system, which is cooperating with at least a control unit and a plurality of power outlet with an electronic switch. The control unit controls the mode of the electronic switches with turn on or off. The short-circuit current protecting method includes the following steps. Step 1 is detecting at least a current signal value of an AC power. Step 2 is determining whether the current signal value is greater than a predetermined current threshold. Step 3 is enabling a short-circuit current analyzing module if the current signal value is greater than the predetermined current threshold. Step 4 is turning off at least one of the electronic switches if the short-circuit state is determined by the short-circuit current analyzing module.

To achieve the above purpose, the present invention provides a charging control system, which includes a power converting unit, a control unit, an electronic switch unit, a drive unit, a transmission unit and a feedback unit. The power converting unit has an input end receiving an AC power and an output end outputting a DC power. The control unit is electrically connected to the output end of power converting unit to receive DC power and output a group of switch signal. The electronic switch unit has a plurality of electronic switches. The drive unit is electrically connected to the control unit and electronic switch unit separately, and receives the switch signal to control the action of the electronic switch unit. The transmission unit is electrically connected to the input end of power converting unit and the electronic switch unit, and transmits the AC power to the electronic switch unit. The feedback unit is respectively electrically connected to the transmission unit and control unit, and generates a current signal value to the control unit based on the AC power; the control unit will determine whether the current signal value is greater than a predetermined current threshold, a short-circuit current analyzing module of the control unit will be enabled if the current signal value is greater than the predetermined current threshold, besides, at least one of the electronic switches will be turned off if the short-circuit state is determined by the short-circuit current analyzing module.

As mentioned above, a charging control system and short-circuit current protecting method thereof in the present invention is to make use of the short-circuit current analyzing module of the control unit to analyze and determine that the abnormality is short-circuit current or inrush current in the extreme short time of two duty cycles while detecting any abnormality. Therefore, it can carry out the response action in a real-time and correct way, increase the service life of the charging control system and enhance the use efficiency of the charging control system.

BRIEF DESCRIPTION OF THE DRAWINGS

The parts in the drawings are not necessarily drawn to scale, the emphasis instead being placed upon clearly illustrating the principles of at least one embodiment. In the drawings, like reference numerals designate corresponding parts throughout the various diagrams, and all the diagrams are schematic.

DETAILED DESCRIPTION

Reference will now be made to the drawings to describe various inventive embodiments of the present disclosure in detail, wherein like numerals refer to like elements throughout.

Figure 1:
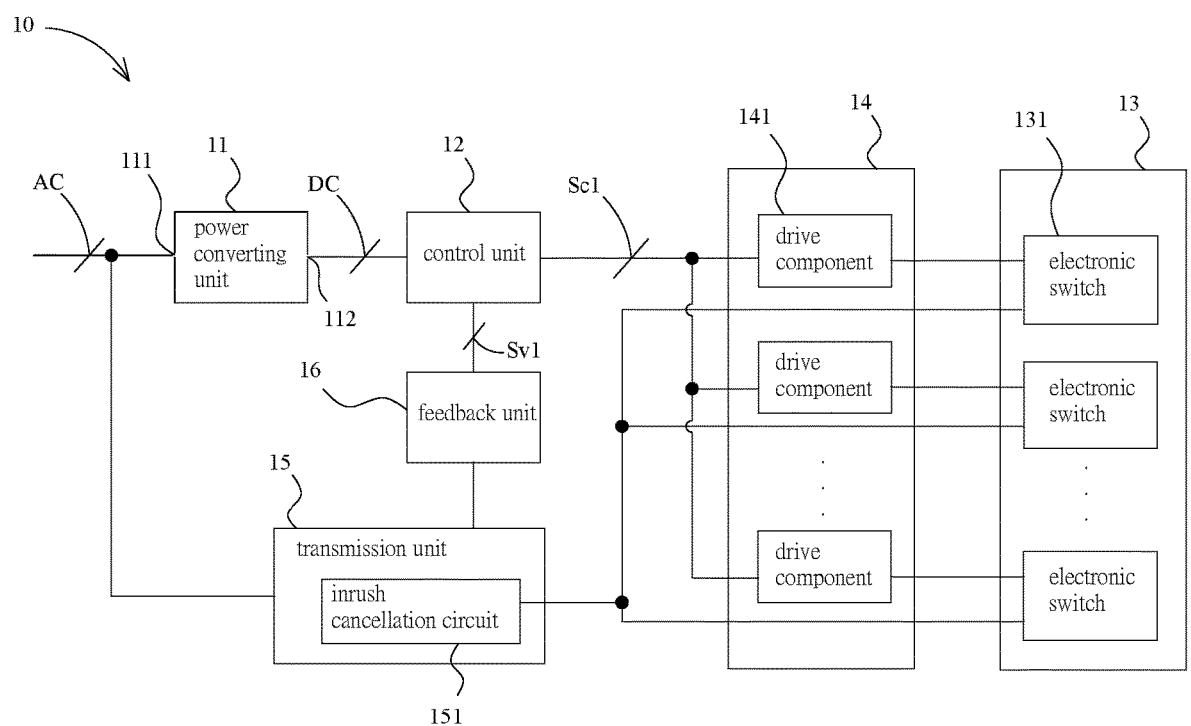
FIG. 1 is a block diagram illustrating the charging control system according to a first embodiment of the present invention.

Refer to FIG. 1, a charging control system 10 of the first embodiment of the present invention includes a power converting unit 11, a control unit 12, an electronic switch unit 13, a drive unit 14, a transmission unit 15 and a feedback unit 16. In the embodiment, the charging control system 10 is to charge a plurality of digital devices (not shown in the FIG.), and the digital devices are portable electronic devices such as tablet PC or laptop.

The power converting unit 11 has an input end 111 and an output end 112. In the embodiment, the power converting unit 11 is an AC-DC converter, of which the input end 111 receives an AC power and the output end 112 outputs a DC power.

The control unit 12 is electrically connected to the output end 112 of the power converting unit 11 to receive the DC power. The electronic switch unit 13 has a plurality of electronic switches 131. In the embodiment, the electronic switches 131 are respectively a relay, and its post stage is electrically connected to a power outlet (not shown in the FIG.). The drive unit 14 is electrically connected to the control unit 12 and the electronic switch unit 13. In the embodiment, the drive unit 14 has a plurality of drive components 141, which are respectively electrically connected to various electronic switches 131.

The control unit 12 outputs a group of switch signal Sc1 to the drive unit 14 to control the action of electronic switch unit 13. Furthermore, this group of switch signal Sc1 can respectively control the action of various electronic switches 131.

The transmission unit 15 is respectively electrically connected to the input end 111 of the power converting unit 11 and the electronic switch unit 13, to transmit AC power to the electronic switch unit 13. In the embodiment, the transmission unit 15 includes a transmission line and an inrush cancellation circuit 151. The inrush cancellation circuit 151 can reduce the shock of inrush current for system.

The feedback unit 16 is respectively electrically connected to the transmission unit 15 and the control unit 12. In the embodiment, the feedback unit 16 is a current detection unit, which generates a current signal value Sv1 to the control unit 12 based on AC power.

Figure 2:
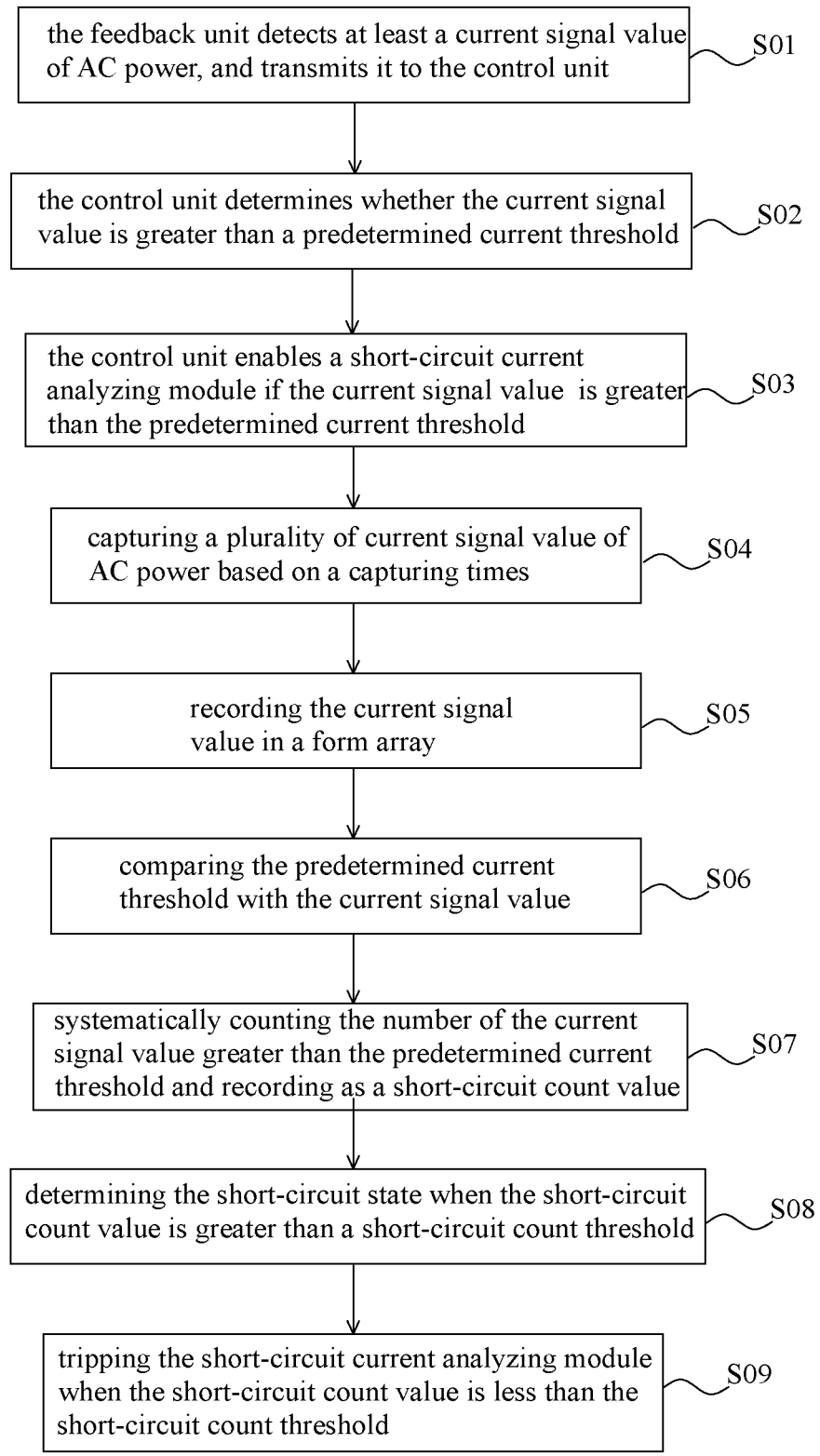
FIG. 2 is a flow chart showing the short-current circuit protecting method according to a second embodiment of the present invention.

Refer to related FIGS. and the above-mentioned, the short-circuit protecting method of the charging control system of the second embodiment of the present invention is further described, and is cooperating with the above charging control system. Refer to FIG. 2, the short-circuit protecting method includes Steps S01~S09.

In Step S01, the feedback unit 16 detects at least a current signal value Sv1 of AC power, and transmits it to the control unit 12. The current signal value Sv1 refers to the current level of AC power. In Step S02, the control unit 12 determines whether the current signal value Sv1 is greater than a predetermined current threshold. In Step S03, the control unit 12 enables a short-circuit current analyzing module if the current signal value Sv1 is greater than the predetermined current threshold. Then, the short-circuit current analyzing module will execute the following step during two duty cycles. Step S04 is to capture a plurality of current signal value Sv1 of AC power based on capturing times. Step S05 is to record the current signal value Sv1 in a form array. Step S06 is to compare the predetermined current threshold with the current signal value Sv1 in the form array in order. Step S07 is to systematically count the number of the current signal value Sv1 greater than the predetermined current threshold and recording as a short-circuit count value. Step S08 is to determine the short-circuit state when the short-circuit count value is greater than a short-circuit count threshold. Step S09 is to trip the short-circuit current analyzing module when the short-circuit count value is less than the short-circuit count threshold.

The third embodiment is enumerated below to describe the actual operating method of the short-circuit protecting method of the second embodiment of the present invention.

Suppose the charging system operates with 60 Hz AC power; to gain more accurate result, 40 data are sampled in each duty cycle in the embodiment for description. In other words, the sampling interval time (Ts) of the embodiment is shown in the formula below:

$$Ts=1/(60*40)$$

Wherein the sampling interval time is 416.67 uS.

In addition, the rated current of the charging control system 10 of the embodiment is set as 12 A, the detection range of the current detection unit of the feedback unit 16 is 0~36 A, and the predetermined current threshold is set as 35 A.

The inrush current generally lasts about 0.5~1 duty cycle, and is rapid decline, therefore, the embodiment takes two duty cycles as embodiment to exclude the condition of inrush current. In the two duty cycles, the predetermined capturing times is set as 80, while more than 40 data exceed the predetermined current threshold, it can be determined as short-circuit current, so the short-circuit count threshold is set as 40 data.

Figure 3:
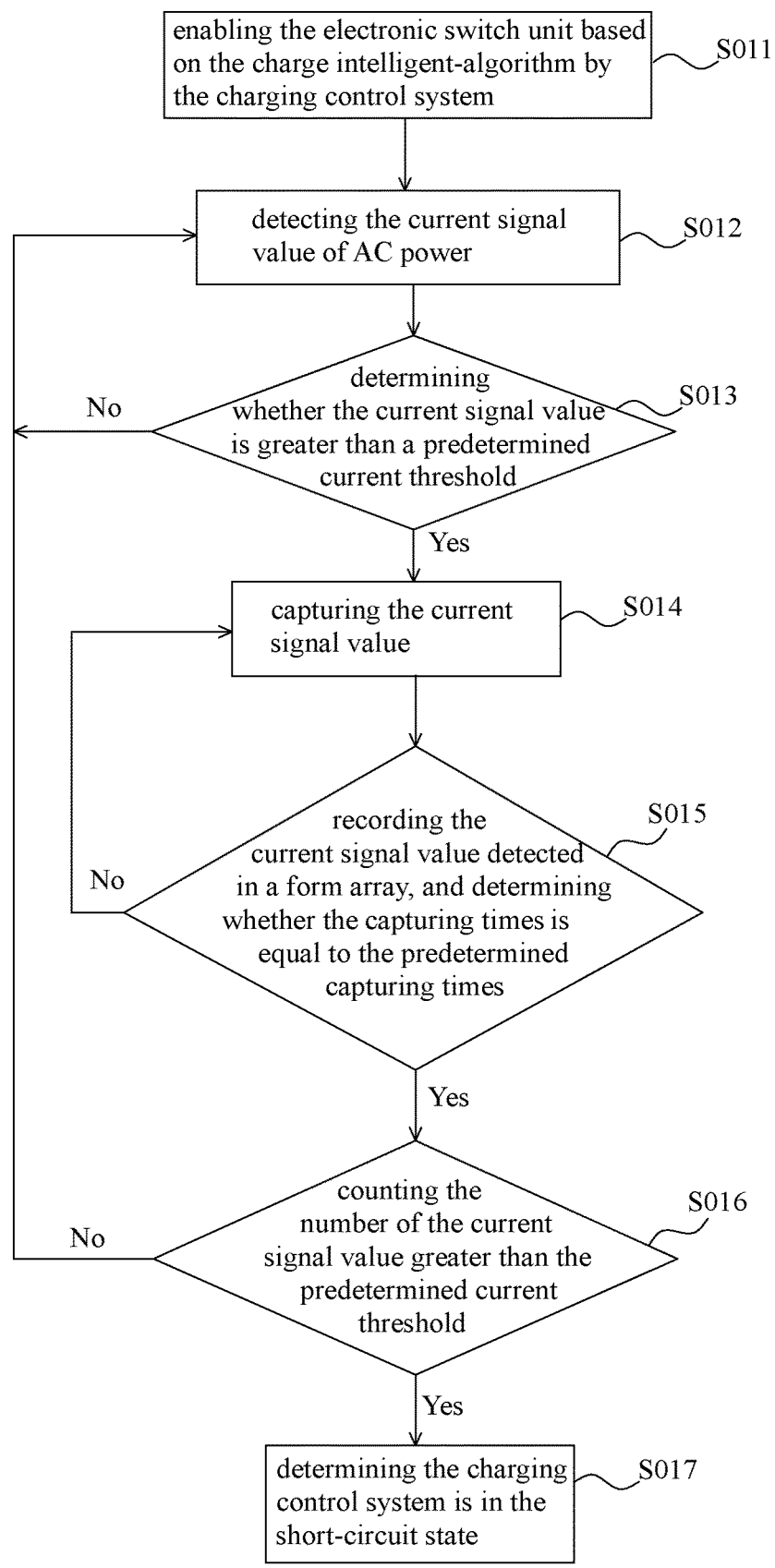
FIG. 3 is a flow chart showing the short-current circuit protecting method according to a third embodiment of the present invention.

Refer to FIG. 3 and the above-mentioned, the charging control system 10 executes the following steps.

In step S011, is to enable the electronic switch unit 13 based on the charge intelligent-algorithm by the charging control system 10.

Step S012 is to detect the current signal value Sv1 of AC power.

Step S013 is to determine whether the current signal value Sv1 is greater than a predetermined current threshold; Step S014 is executed if the result is "YES"; Step S012 is executed if the result is "NO".

Step S014 is to capture the current signal value Sv1.

Step S015 is to record the current signal value Sv1 detected in a form array (as shown in Table 1), and to determine whether the capturing times is equal to the predetermined capturing times; if the result is "YES", Step S016 is executed; if the result is "NO", Step S014 is executed after the capturing times+1.

TABLE 1

| capturing times | current signal value ( A ) | | | | | | | | |
|---|---|---|---|---|---|---|---|---|---|
| 1~10  | 30.0 | 35.5 | 35.5 | 36.0 | 36.0 | 36.0 | 36.0 | 35.5 | 35.5 | 30.0 |
| 11~20 | 30.0 | 35.5 | 35.5 | 36.0 | 36.0 | 36.0 | 36.0 | 35.5 | 35.5 | 30.0 |
| 21~30 | 30.0 | 35.5 | 35.5 | 36.0 | 36.0 | 36.0 | 36.0 | 35.5 | 35.5 | 30.0 |
| 31~40 | 30.0 | 35.5 | 35.5 | 36.0 | 36.0 | 36.0 | 36.0 | 35.5 | 35.5 | 30.0 |
| 41~50 | 30.0 | 35.5 | 35.5 | 36.0 | 36.0 | 36.0 | 36.0 | 35.5 | 35.5 | 30.0 |
| 51~60 | 30.0 | 35.5 | 35.5 | 36.0 | 36.0 | 36.0 | 36.0 | 35.5 | 35.5 | 30.0 |
| 61~70 | 30.0 | 35.5 | 35.5 | 36.0 | 36.0 | 36.0 | 36.0 | 35.5 | 35.5 | 30.0 |
| 71~80 | 30.0 | 35.5 | 35.5 | 36.0 | 36.0 | 36.0 | 36.0 | 35.5 | 35.5 | 30.0 |

Step S016 is to count the number of the current signal value Sv1 greater than the predetermined current threshold in the form array and to record the number as a short-circuit count value, and to compare whether the short-circuit count value is greater than the short-circuit count threshold; Step S017 is executed if the result is "YES"; Step S012 is executed if the result is "NO".

Step S017 is to determine the charging control system 10 is in the short-circuit state. In the step, the control unit 12 trips the short-circuit current analyzing module, turns off the electronic switch unit 13 instantly, triggers the audible unit, the light-emitting unit or the display unit (not shown in the FIG.), stores and records the information of short-circuit state.

As can be seen from the above table, the number of short-circuit count value is 64, which exceeds 40 of the short-circuit count threshold, therefore, the control unit 12 will determine the short-circuit current instantly and thus turn off the electronic switch unit 13. The above action is completed within two duty cycles so that it only takes 33.34 mS.

Figure 4:
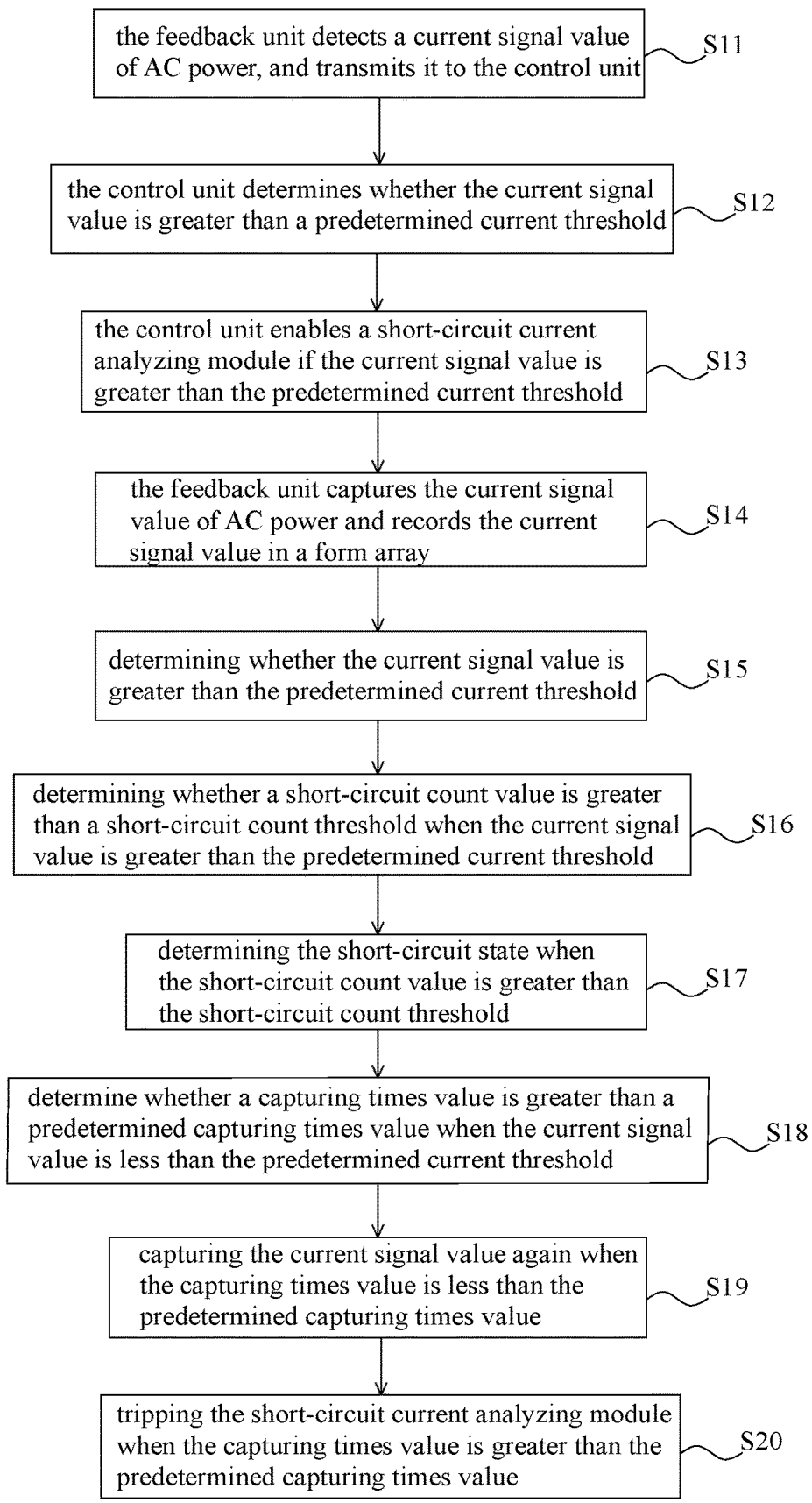
FIG. 4 is a flow chart showing the short-current circuit protecting method according to a fourth embodiment of the present invention.

Refer to related FIGS. and FIG. 1, the short-circuit protecting method of the charging control system of the fourth embodiment of the present invention is further described, and is cooperating with the above charging control system 10. Refer to FIG. 4, the short-circuit protecting method includes Step S11~S20.

In Step S11, the feedback unit 16 detects a current signal value Sv1 of AC power, and transmits it to the control unit 12. In Step S12, the control unit 12 determines whether the current signal value Sv1 is greater than a predetermined current threshold. In Step S13, the control unit 12 enables a short-circuit current analyzing module if the current signal value Sv1 is greater than the predetermined current threshold. Then, the short-circuit current analyzing module will execute the following step in two duty cycles. In Step S14, the feedback unit captures the current signal value Sv1 of AC power and records the current signal value Sv1 in a form array. Step S15 is to determine whether the current signal value Sv1 is greater than the predetermined current threshold. Step S16 is to determine whether a short-circuit count value is greater than a short-circuit count threshold when the current signal value Sv1 is greater than the predetermined current threshold. Step S17 is to determine the short-circuit state when the short-circuit count value is greater than the short-circuit count threshold. Step S18 is to determine whether a capturing times value is greater than a predetermined capturing times value when the current signal value Sv1 is less than the predetermined current threshold. Step S19 is to capture the current signal value Sv1 again when the capturing times value is less than the predetermined capturing times value. Step S20 is to trip the short-circuit current analyzing module when the capturing times value is greater than the predetermined capturing times value.

The fifth embodiment is enumerated below to describe the actual operating method of the short-circuit protecting method of the fourth embodiment of the present invention.

Suppose the charging system operates with 60 Hz AC power; to gain more accurate result, 40 data are sampled in each duty cycle in the embodiment for description. In other words, the sampling interval time (Ts) of the embodiment is shown in the formula below:

$$Ts=1/(60*40)$$

Wherein the sampling interval time is 416.67 uS.

In addition, the rated current of the charging control system 10 of the embodiment is set as 12 A, the detection range of the current detection unit of the feedback unit 16 is 0~36 A, and the predetermined current threshold is set as 35 A.

The inrush current generally lasts about 0.5~1 duty cycle, and is rapid decline, therefore, the embodiment takes two duty cycles as embodiment to exclude the condition of inrush current. In the two duty cycles, the predetermined capturing times is set as 80, while more than 40 data exceed the predetermined current threshold, it can be determined as short-circuit current, so the short-circuit count value is set as 40 data.

Figure 5:
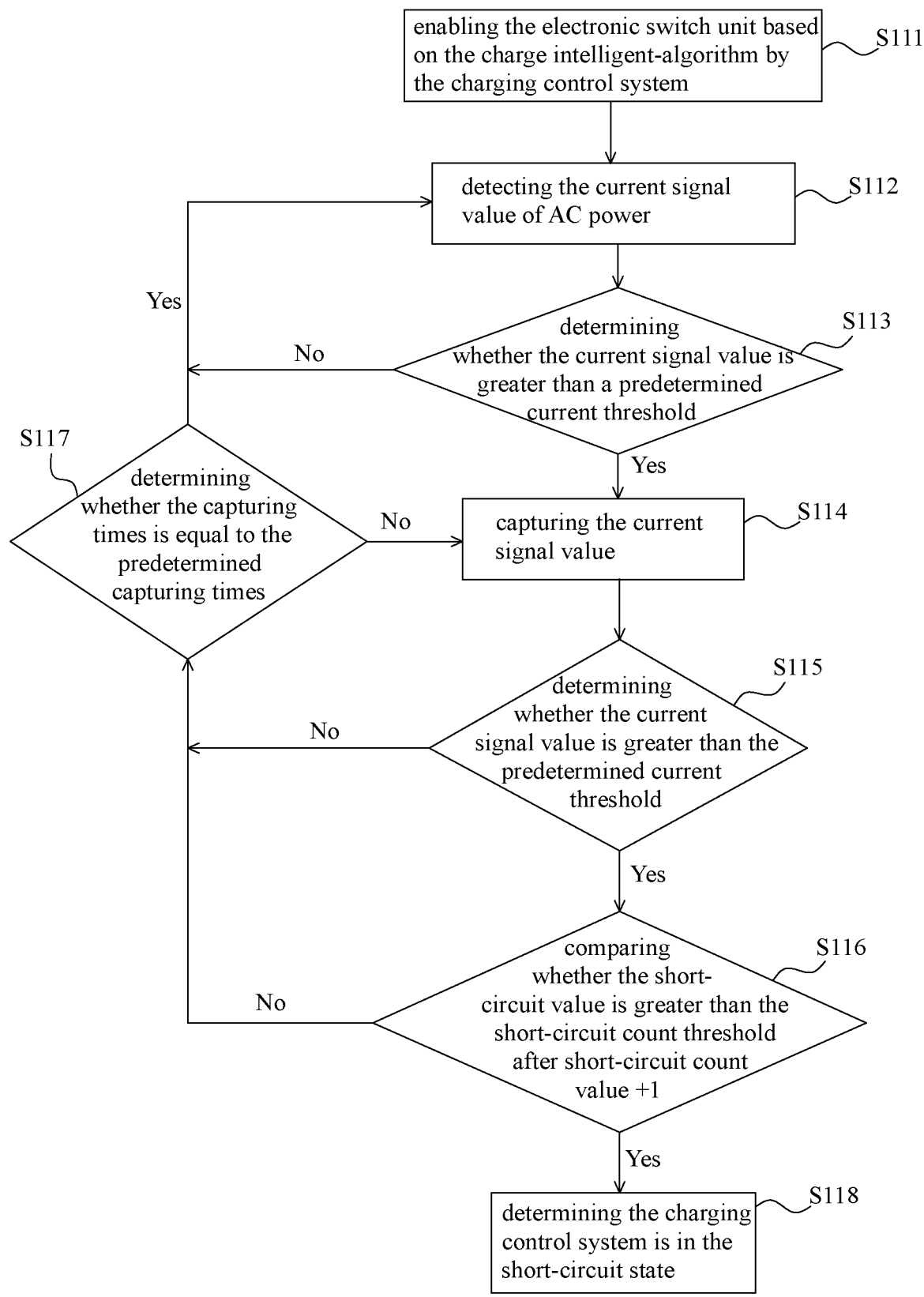
FIG. 5 is a flow chart showing the short-current circuit protecting method according to a fifth embodiment of the present invention.

Refer to FIG. 5 and the above-mentioned, the charging control system 10 executes the following steps.

In Step S111, the charging control system 10 enables the electronic switch unit 13 based on the charge intelligent-algorithm.

Step S112 is to detect the current signal value Sv1 of AC power.

Step S113 is to determine whether the current signal value Sv1 is greater than a predetermined current threshold; Step S114 is executed if the result is "YES"; Step S112 is executed if the result is "NO".

Step S114 is to capture the current signal value Sv1, and to record the current signal value Sv1 detected in a form array (as shown in Table 2).

Step S115 is to determine whether the current signal value Sv1 is greater than the predetermined current threshold; Step S116 is executed if the result is "YES"; Step S117 is executed if the result is "NO".

Step S116 is to compare whether the short-circuit value is greater than the short-circuit count threshold after short-circuit count value+1; Step S118 is executed if the result is "YES"; Step S117 is executed if the result is "NO".

Step S117 is to determine whether the capturing times value is equal to the predetermined capturing times value; Step S112 is executed if the result is "YES"; Step S114 is executed after the capturing times+1 if the result is "NO".

TABLE 2

| Capturing times | Current signal value (A) | | | | | | | | |
|---|---|---|---|---|---|---|---|---|---|
| 1~10  | 30.0 | 35.5 | 35.5 | 36.0 | 36.0 | 36.0 | 36.0 | 35.5 | 35.5 | 30.0 |
| 11~20 | 30.0 | 35.5 | 35.5 | 36.0 | 36.0 | 36.0 | 36.0 | 35.5 | 35.5 | 30.0 |
| 21~30 | 30.0 | 35.5 | 35.5 | 36.0 | 36.0 | 36.0 | 36.0 | 35.5 | 35.5 | 30.0 |
| 31~40 | 30.0 | 35.5 | 35.5 | 36.0 | 36.0 | 36.0 | 36.0 | 35.5 | 35.5 | 30.0 |
| 41~50 | 30.0 | 35.5 | 35.5 | 36.0 | 36.0 | 36.0 | 36.0 | 35.5 | 35.5 | 30.0 |
| 51~60 | 30.0 | 35.5 | | | | | | | | |

Step S118 is determining the short-circuit state; the control unit 12 trips the short-circuit current analyzing module, turns off the electronic switch unit 13 instantly, triggers the audible unit, light-emitting unit or display unit, stores and records the information of short-circuit state.

As can be seen from the above table, when the current signal value Sv1 is recorded to be the 52nd, the number of short-circuit count value is 41, which exceeds 40 of the short-circuit count threshold, therefore, the control unit 12 will determine the short-circuit current instantly and thus turn off the electronic switch unit 13. The above action occurs when recording the 52nd current signal value so that it only takes 21.67 mS.

In summary, a charging control system and a short-circuit current protecting method thereof in the present invention is to make use of the short-circuit current analyzing module of the control unit to analyze and determine that the abnormality is short-circuit current or inrush current in the extreme short time of two duty cycles or less than two duty cycles while detecting any abnormality. Therefore, it can carry out the response action in a real-time and correct way, increase the service life of the charging control system and enhance the use efficiency of the charging control system.

Even though numerous characteristics and advantages of certain inventive embodiments have been set out in the foregoing description, together with details of the structures and functions of the embodiments, the disclosure is illustrative only. Changes may be made in detail, especially in matters of arrangement of parts, within the principles of the present disclosure to the full extent indicated by the broad general meaning of the terms in which the appended claims are expressed.

What is claimed is:

1. A short-circuit current protecting method of a charging control system, which is cooperating with at least a control unit and a plurality of power outlet electrically connected to an electronic switch, wherein the control unit controls the mode of the electronic switches with turn on or off, comprising the following steps:
   detecting at least a current signal value of an AC power;
   determining whether the current signal value is greater than a predetermined current threshold;
   enabling a short-circuit current analyzing module if the current signal value is greater than the predetermined current threshold; and
   turning off at least one of the electronic switches if a short-circuit state is determined by the short-circuit current analyzing module,
   wherein the short-circuit current analyzing module determines the short-circuit state in two duty cycles so as to exclude an inrush current condition from the short-circuit state, and thus avoids erroneous determination of the short-circuit state and erroneous short-circuit protecting action.

2. The short-circuit current protecting method of claim 1, the short-circuit current analyzing module executes the following step in two duty cycles:
   capturing a plurality of current signal value of AC power based on a capturing times value;
   recording the current signal value in a form array;
   comparing the predetermined current threshold with the current signal value in the form array in order after the record is completed;
   counting the number of the current signal value greater than the predetermined current threshold and recording as a short-circuit count value; and
   determining the short-circuit state when the short-circuit count value is greater than a short-circuit count threshold.

3. The short-circuit current protecting method of claim 2, the short-circuit current analyzing module is tripped when the short-circuit count value is less than the short-circuit count threshold.

4. The short-circuit current protecting method of claim 1, the short-circuit current analyzing module will executes the following step in two duty cycles:
   capturing the current signal value of AC power;
   determining whether the current signal value is greater than a predetermined current threshold;
   determining whether a short-circuit count value is greater than a short-circuit count threshold when the current signal value is greater than the predetermined current threshold; and
   determining the short-circuit state when the short-circuit count value is greater than a short-circuit count threshold.

5. The short-circuit current protecting method of claim 4, further comprising:
   determining whether a capturing times value is greater than a predetermined capturing times value when the current signal value is less than the predetermined current threshold;
   capturing the current signal value again when the capturing times value is less than the predetermined capturing times value; and
   tripping the short-circuit current analyzing module when the capturing times value is greater than the predetermined capturing times value.

6. The short-circuit current protecting method of claim 4, further comprising:
   determining whether a capturing times value is greater than a predetermined capturing times value when the current signal value is less than the predetermined current threshold;
   capturing the current signal value again when the capturing times value is less than the predetermined capturing times value; and
   tripping the short-circuit current analyzing module when the capturing times value is greater than the predetermined capturing times value.

7. The short-circuit current protecting method of claim 1, when the short-circuit state is determined by the short-circuit current analyzing module, further comprising:
    triggering an audible unit, a light-emitting unit or a display unit; and
    storing and recording the information of the short-circuit state.

8. A charging control system, comprising:
    a power converting unit, which has an input end receiving an AC power and an output end outputting a DC power;
    a control unit, which is electrically connected to the output end of the power converting unit to receive the DC power and output a set of switch signal;
    an electronic switch unit, which has a plurality of electronic switches;
    a drive unit, which is electrically connected to the control unit and the electronic switch unit separately, and receives the switch signal to control the action of the electronic switch unit;
    a transmission unit, which is electrically connected to the input end of the power converting unit and the electronic switch unit, and transmits the AC power to the electronic switch unit, the transmission unit comprises an inrush cancellation circuit to reduce a shock of inrush current; and
    a feedback unit is respectively electrically connected to the transmission unit and the control unit, and generates a current signal value to the control unit based on the AC power;
    wherein the control unit will determine whether the current signal value is greater than a predetermined current threshold, a short-circuit current analyzing module of the control unit will be enabled if the current signal value is greater than the predetermined current threshold, besides, at least one of the electronic switches will be turned off if a short-circuit state is determined by the short-circuit current analyzing module, and wherein the short-circuit current analyzing module determines the short-circuit state in two duty cycles so as to exclude an inrush current condition from the short-circuit state, and thus avoids erroneous determination of the short-circuit state and erroneous short-circuit protecting action.

9. The charging control system of claim 8, after the short-circuit current analyzing module is enabled, the control unit is to record a plurality of current signal value captured by the feedback unit in a form array, compare a predetermined current threshold with the current signal value in the form array in order, count the number of the current signal value greater than the predetermined current threshold and record as a short-circuit count value; the short-circuit state is determined when the short-circuit count value is greater than a short-circuit count threshold.

10. The charging control system of claim 9, the short-circuit current analyzing module is turned off if the short-circuit count value is less than the short-circuit count threshold.

11. The charging control system of claim 8, after the short-circuit current analyzing module is enabled, the control unit is to determine whether the current signal value captured by the feedback unit is greater than the predetermined current threshold, if the current signal value is greater than the predetermined current threshold, the control unit will determine whether a short-circuit count value is greater than a short-circuit count threshold, the short-circuit state is determined when the short-circuit count value is greater than a short-circuit count threshold.

12. The charging control system of claim 11, further comprising:
    determining whether a capturing times value is greater than a predetermined capturing times value by the control unit if the current signal value is less than the predetermined current threshold;
    capturing the current signal value again by the feedback unit if the capturing times value is less than the predetermined capturing times value; and
    turning off the short-circuit current analyzing module if the capturing times value is greater than the predetermined capturing times value.

13. The charging control system of claim 11, further comprising:
    determining whether a capturing times value is greater than a predetermined capturing times value by the control unit when the short-circuit count value is less than the short-circuit count threshold;
    capturing the current signal value again by the feedback unit if the capturing times value is less than the predetermined capturing times value; and
    turning off the short-circuit current analyzing module if the capturing times value is greater than the predetermined capturing times value.

14. The charging control system of claim 8, further comprises an audible unit, a light-emitting unit or a display unit, which are electrically connected to the control unit, respectively.

* * * * *